United States Patent [19]

Miyazaki et al.

[11] 3,829,228
[45] Aug. 13, 1974

[54] PAVEMENT EXPANSION JOINT AND JOINT SEAL

[75] Inventors: Norihiko Miyazaki; Minoru Ishii, both of Tokyo; Hiroji Sakurai, Nishikasugai; Hisao Suzuki; Katsuyoshi Nagatsuma, both of Tokyo; Hitoshi Furukawa, Hirakata City, all of Japan

[73] Assignees: Nihon Kogyo Co., Ltd., by said Miyazaki; Ishii Civil Engineers Consulting Inst. Ltd., both of Tokyo, ; by said Ishii; Asahi Kasei Kogyo K.K., Osaka, ; by said Sakurai; Nihon Polymer Co., Ltd., ; by said Suzuki; Hitachi Cable, Ldt., both of Tokyo, ; by said Nagatsuma; Ciba-Geigy (Japan) Ltd., Osaka, all of, Japan; by said Furukawa

[22] Filed: Dec. 27, 1971

[21] Appl. No.: 212,548

[52] U.S. Cl. .................................. 404/68, 52/573
[51] Int. Cl. ............................................ E01c 11/12
[58] Field of Search ............ 404/47, 64, 65, 66, 67, 404/69, 74, 68; 52/98, 232, 573, 393, 396; 260/28, 37 EP; 14/16; 161/186, 214

[56] References Cited
UNITED STATES PATENTS

| | | | |
|---|---|---|---|
| 3,094,498 | 6/1963 | Landolt | 260/37 EP X |
| 3,105,771 | 10/1963 | Simpson et al. | 260/37 EP X |
| 3,344,720 | 10/1967 | Hallock | 14/16 X |
| 3,394,640 | 7/1968 | Dreher | 404/65 X |
| 3,407,165 | 10/1968 | Oepkes et al. | 260/28 X |
| 3,521,528 | 7/1970 | Wangerow | 404/65 X |
| 3,542,639 | 11/1970 | Manino | 161/186 |
| 3,608,442 | 9/1971 | Berchou et al. | 404/64 |
| 3,663,354 | 5/1972 | Hiroshi Ueno et al. | 161/186 |
| 3,722,379 | 3/1973 | Koester | 404/74 X |

FOREIGN PATENTS OR APPLICATIONS

| | | | |
|---|---|---|---|
| 103,672 | 12/1941 | Sweden | 52/573 |
| 1,051,882 | 12/1966 | Great Britain | 404/67 |
| 873,109 | 6/1971 | Canada | 404/74 |

Primary Examiner—Roy D. Frazier
Assistant Examiner—Thomas J. Holko
Attorney, Agent, or Firm—Armstrong, Nikaido & Wegner

[57] ABSTRACT

A new pavement expansion joint is provided by applying a mixture of epoxy mortar and an aggregate consisting essentially of short glass fibers and silica sand to steel sheets bonded with an easily strippable adhesive capable of forming a bond of high tensile strength. The steel sheets are positioned at the bottom of a frame forming a pavement expansion joint corner. The epoxy mortar is allowed to cure in the joint corner forming a expansion joint of high impact strength. The readily strippable nature of the adhesive makes the joint corner easily replaceable. The removal of the joint can be facilitated by the insertion of an adhesively attached rubber pad between the epoxy layer and a steel sheet or pair of sheets. This Expansion Joint is also easily repaired or reconstructed with a prefabricated expansion joint. Noise by a vehicle passing over the joint can be reduced by positioning a specially designed elastic joint seal between the expansion joints, the joint seal being characterized by spaced apart projections or protuberances extending above the exposed surfaces of the juxtapositioned expansion joints.

8 Claims, 16 Drawing Figures

PAVEMENT EXPANSION JOINT AND JOINT SEAL

BACKGROUND OF THE INVENTION

In known, expansion joint construction anchor bolts are first driven into the slab with metal fittings being fixed subsequently on the bolts. This construction makes it necessary for the primary slab to be destroyed prior to initiation of an installation. Replacement or repair work often results in more work than is really necessary and also in greater cost for repair work than for a new installation. Also if the corner is reenforced resin mortar, the mortar is applied directly to the slab by means of a frame after removing the pavement asphalt. In such a case, all of the installation work must be done on the spot, resulting in a relatively long period of work and, in particular, a far greater cost in repair work because of the need for the prior removal of resin mortar which is stuck stubbornly to the slab.

Thus, the conventional installation has its shortcomings in terms of time and money required for installation and reconstruction work. Moreover, the repair work done on the road requires that the traffic there must be barred temporarily to a considerable inconvenience of the drivers.

The present invention solves this problem by providing an expansion joint which is divisable into units. Each unit may be prepared in a workshop allowing the joint to be completed through mere bonding of units, sometimes including however extraction of the adhesive layer, on the spot. The present invention provides a technique of easy initial installation of the pavement expansion joint, coupled with a technique which make expeditious replacement and repair work possible.

SUMMARY OF THE INVENTION

According to the present invention, the pavement expansion joint unit (to be hereinafter referred to as the joint material), is made by curing in a frame a specially mixed epoxy mortar and a combination of steel sheets or a rubber pad and a steel sheet bonded together with adhesives, with a result that the epoxy material and the sheets are incorporated into one integral unit. This unit is then laid on the top of a pair of slabs of the pavement expansion joint (to be hereinafter referred to as the joint) and bonded thereto. In addition, in between the sheets and adhesives layer, which is readily extractable is provided, and an elastic joint seal is positioned between adjacent expansion joint units.

BRIEF DESCRIPTION OF DRAWINGS

FIG. 2 the replacement unit for the corner reinforcement and pavement material;

FIG. 3 the installation techniques involved;

FIG. 4 the replacement and repair techniques for the said unit; and

FIG. 11 is a cross-sectional view of the seal;

FIGS. 12 – 15 are partial plan views of the top of the seal; and

FIG. 16 is a crossectional view of the seal in actual use.

DETAILED DESCRIPTION

A joint is bound to be damaged under effects of abrasion and impact from a formidable number of automobiles travelling along the pavement over a long period of time, and so it is absolutely necessary that the pavement is repaired and reconstructed to ensure proper road maintenance and safe travel by vehicles. The techniques of the present invention involve no risk whatsoever in damaging the slabs. After removing the damaged material by extracting an adhesives layer from between 2 steel sheets in the joint which was installed under the construction techniques herein described, the corner reinforcement and pavement replacement material (to be hereinafter referred to as the replacement material) under the present invention, consisting of the specially mixed epoxy resin mortar and a sheet of steel affixed thereto which has been, cured in a frame, is bonded to a sheet of steel remaining on the slab; and further, a new extractable layer of adhesives is provided and in between the pair of replacement materials a joint seal rubber is bonded to help make the next repair easy.

Figure 1:
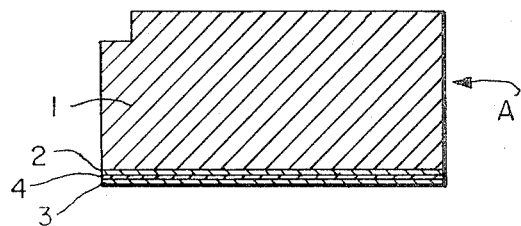
FIGS. 1 to 4 show the pavement expansion joint of the invention with FIG. 1 showing a cross-section of the corner reinforcement and pavement material.

Referring now to FIGS. 1-5, the corner reinforcement and pavement unit is shown in FIG. 1. The steel sheet 2 of which the both surfaces are sandblasted and another similarly treated steel sheet 3 are bonded together with epoxy resin adhesives 4 of great tensile shear strength and relatively high strippability and this is placed at the bottom of a frame in the shape of the joint corner, (not shown) made of polyethylene or other such materials which does not allow epoxy resins to stick thereto. Then a layer of epoxy primer compatible with the metals is applied to the top, and further on top a mixture 1 of epoxy resin, silica sand and short glass fibers is poured. This, still in the frame, is heated in a furnace, until completely cured. Thus, the reinforcement and pavement unit A consisting of epoxy mortar with other compounds and steel sheets is made into one solid form which is removed from the frame.

The steel sheet 2 referred to in FIG. 1 can be an aluminum sheet or other metals such as copper brass and duralumin and it is not absolutely imperative that the sheet is of steel material so long as the thickness is approximately 1 mm. It is desirable however that the thickness of steel sheet 3 is kept within the range of 6 – 9 mm. For use in bonding the steel sheet 2 to steel sheet 3 an epoxy resin adhesive of any type which is excellent in tensile shear strength and which enables relatibely easy stripping of the adhesive layer is used. The amount of the adhesive to be used is considered proper if it is applied at the rate of 0.03 g/cm – 0.04 g/cm.

Epoxy adhesives comprising of two kinds of different liquids are generally cured at about 25°C (normal temperature). These liquids are Bisphenol Epoxy resin and polyamide having amine value of 350. The polyamide is used as an epoxy resin hardner, and is mixed with the other elements and cured at a temperature. Epoxy adhesives, for instance, Epomer A-100 were put to test in accordance with ASTM D-1002, and the outcome obtained was the tensile shear strength of 191 kg/cm and a relatively easy stripping of the adhesive layer.

150 kg/m$^2$ tensile shear strength is suitable for this expansion joint. Making use of this in the practice of the present invention, a wedge was pounded into the adhesive layer between the steel sheets after the resin was fully cured. The finding was that pulling out the adhesive layer was an easy task. The adhesive required for the present invention must meet the foregoing characteristics.

The epoxy mortar to be applied has silica sand and epoxy resin mixed in the ratio of 5 to 1 along with short glass fibers with a length of about 1 cm and a diameter of 9.5 microns. The glass fibers amount to about 5 percent of the volume of the epoxy resin mortar which is spcially mixed after being immersed in the epoxy resin monomer. This epoxy resin mortar contains coal tar and the tar epoxy mortar is also cured at about 25° C (normal temperature). Tar epoxy resin is made from two kind of liquids, one is Bisphenol Epoxy resin and the other is coal tar mixed with aromatic modified polyamide which is used for epoxy resin hardner. This hardner's amine value is 120. These two kinds of liquids are mixed into one as a ratio of 1 : 1 and cured by normal temperature. Silica sand is also used in the tar epoxy mortar. The mortar was tested in accordance with ASTM E-11-61. The tar epoxy mortar must be used with two kinds of silica sand. One is screened at 16, 20, 35 and 48 mesh and its volumes is 9, 65, 24 and 2 percent each (The ratio of 16 to 9, 20 to 65, 35 to 24 and 48 mesh to 2 percent). Another is screened at 65, 100, 150, 200 mesh and less than 200 mesh and its volumes is 11, 35, 33, 12, and 9 percent (The ratio of 65 to 11, 100 to 35, 150 to 33, 200 to 12 and less than 200 mesh to 9 percent). These silica sands are mixed at the rate of 7 : 3. The epoxy resin primer is quite similar to epoxy adhesives and its hardner's amine value is 400 which is quite suitable for the primer.

The hardened substance of epoxy mortar comprising a mixture of epoxy resin, silica and short glass fibers is far greater in strength and excels in impact resistance by about 30 percent over the epoxy mortar substance comprising a mixture of only epoxy resin and silica sand.

The epoxy mortar mixture, therefore, of not only silica sand but of short glass fibers which is most suitable for use in the corner pavement of the joint where it receives incessant impact.

Generally it is understood that at a temperature of 25° C, the epoxy resin is cured to an extent of 80 – 90 percent over one week's time. Under the present invention, however, the joint material is prepared in a workshop where curing by heating is possible. The frame, in which the epoxy mortar has been poured, is placed in a furnace where the mortar is heated at 40°C for 2 hours, then, after curing by a similar process at 70° C for 3 hours. This process will cure the resin mortar to a degree of about 95 percent and extracted from the frame, the material may be used at once. The frame is generally about 10 cm – 20 cm in breadth, 5 cm – 10 cm in thickness and 100 cm – 200 cm in length.

The corner reinforcement and pavement material thus prepared will have the characteristics of the joint material which is in the form of the required corner as shown in FIG. 1. The surface is well protected against impact, it being of the material 1 of the hard epoxy mortar substance with the structure beneath involving the adhesives layer 4 bonding steel sheets 2 and 3 to each other. A wedge driven into a corner of the said adhesive layer will make it comparatively easy for the layer to be drawn out, which in turn will render the inevitable replacement and repair work in future an easy task. The 1 mm thickness steel sheet 2 and 5 mm thickness steel sheet 3 are bonded into one steel sheet with the epoxy adhesives 4, and after they are cured perfectly, they are bonded so hard that a wedge must strike into the edge of these bonding steel sheets and move it up and down. The steel sheets are easily divided into two steel sheets, thus, the epoxy adhesives has a great tensile shear strength, but its strippability (pilling) is comparatively weakened by an irregular impact. And this phenomenon is one of the important factors in this invention.

Figure 3:
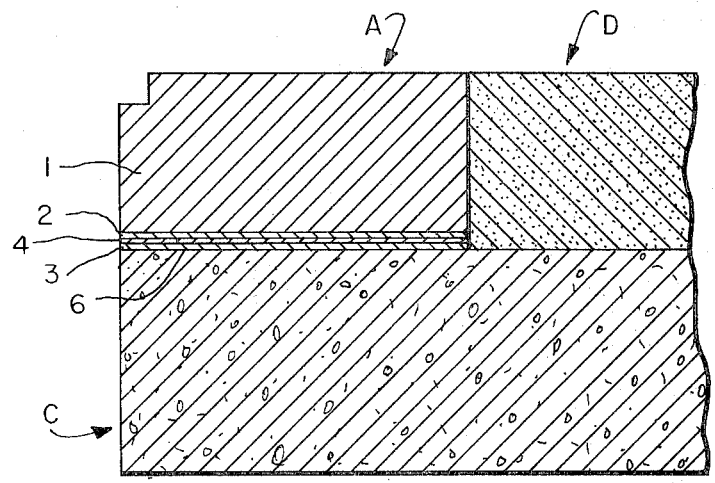
Figure 4:
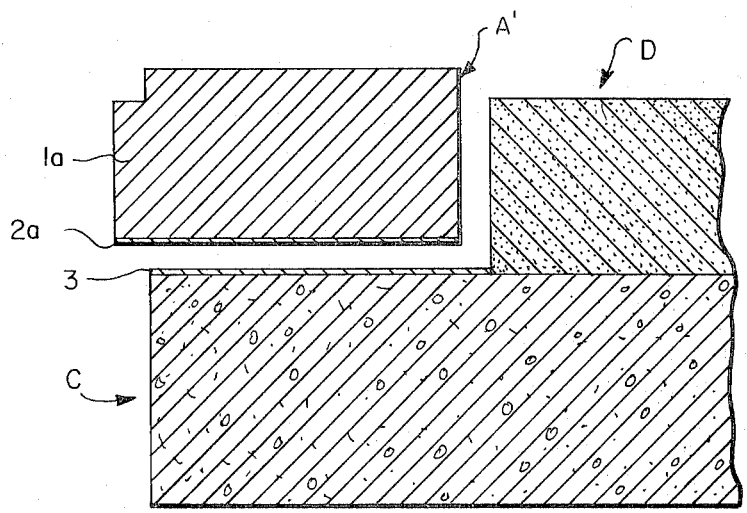
Figure 5:
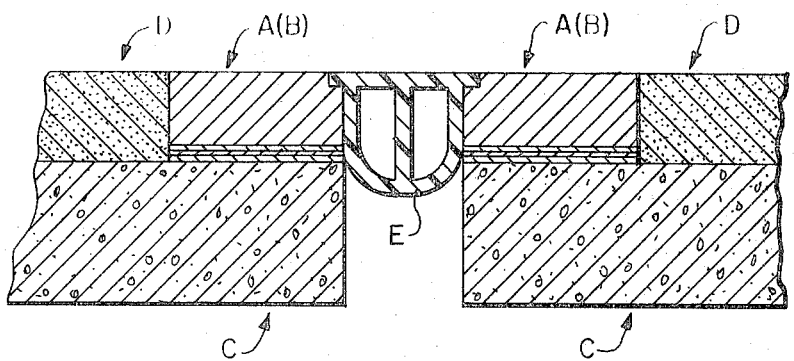
FIG. 5 depicting the cross-sectional view of the completed pavement expansion joint.

Further, the material A thus prepared is bonded securely to the top of the slab C at an end with the epoxy resin adhesive 6 as is illustrated in FIG. 3. The two of these units then are combined into one finished joint with the application of joint seal rubber E. The bonding method involved requires removal first of a good amount of laytance from the top of the concrete surface by scraping the top of the slab with the wirebrush before application of the epoxy resin adhesive to the bare concrete surface, followed by sand blasting slightly the steel sheet at the bottom of the joint material prepared previously, letting the bare steel to show itself. The steel sheet is then positioned on the adhesive applied on the slab surface for bonding. The amount of adhesive to be applied varies with the conditions of the exposed slab surface, but it should be regarded as appropriate if it were applied at the rate of about 0.05 g/cm$^2$. With an elapse of at least 12 hours after the work was finished, the pavement is definitely ready for traffic by vehicles of various types. The foregoing engineering work may be performed prior to laying asphalt pavement or cutting open the asphalt pavement after the asphalt has been laid.

The present invention offers in addition the engineering techniques related to replacement and repairing of the joint unit since it is apparent that under effect of the relentless external impact, the joint thus installed is bound to become damaged, and thus require repair for the sake of traffic safety and road maintenance.

Figure 2:
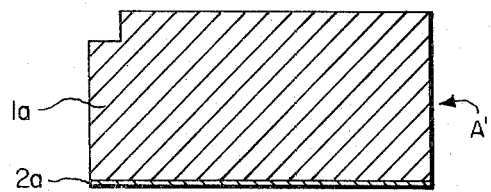

Under the technique of the present invention, a wedge is driven into the readily extractable adhesive layer 4 between the steel sheets 2 and 3 that were bonded to each other as shown in FIG. 3. By gouging, the adhesive layer and the joint material are pulled out. This will leave the steel sheet 3 on the slab C as the joint material is removed. Thus, leaving the steel sheet 3 as it is on the slab, the remnants of the adhesive on the surface of the steel sheet are removed by applying a release agent, followed by sandblasting of the steel sheet to make it bare. next, the same type of adhesive as used in the prior bonding of the 2 steel sheets is administered to the slab, on which the replacement material A' as shown in FIG. 2, B is placed for bonding. The steel sheet surface of the replacement material is sandblasted once to a slight degree before bonding. The adhesive layer, bonding steel sheet 2a of the replacement material A' to steel sheet 3 on the slab C, function in a manner identical to the adhesive layer previously pulled off. Its joint material is replaceable and repairable with relative ease when the time comes, with the adhesive layer readily taken off.

Further, the technique relates to the joint seal rubber which is applied to a pair of replacement material units thus fitted in. This procedure is repeated in subsequent work of replacing or repairing the part of the pavement. The pavement thus fixed can be opened to vehicular traffic 12 hours after the work is concluded at the latest.

The replacement material A' in FIG. 2 designed for use in such a case is produced to the same specifications as the material A as shown in FIG. 1 in the workshop, but has only steel sheet 2 a, which is identical in quality to steel sheet 2. Accordingly, the material has a thickness which is less by the thickness steel sheet 3, with identical performance to that of the previously used material. It is to be noted that the replacement material thus used in either replacement or repair work looks precisely the same when the repair is completed as the one used in a totally new layout. In terms of work period and cost, too, there will be no substantial deviation from that of new installations.

In an alternate embodiment of the invention improved reinforcement and paving materials are applied with a rubber pad provided for the corner materials thereby making it easy for the adhesives layer to be stripped off with application of a small force and at the same time, protecting the adhesives layer from force of impact.

Figure 6:
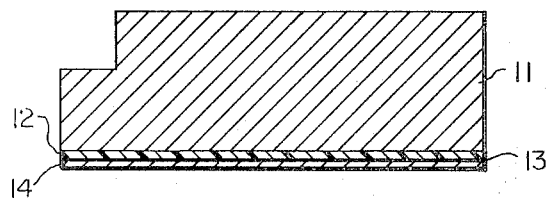
FIG. 6 shows the cross-section of the corner reinforcement and paving materials of an alternate embodiment intended for repair work.
Figure 7:
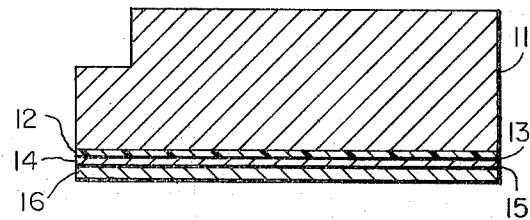
FIG. 7 that of the same material for fresh installation.
Figure 8:
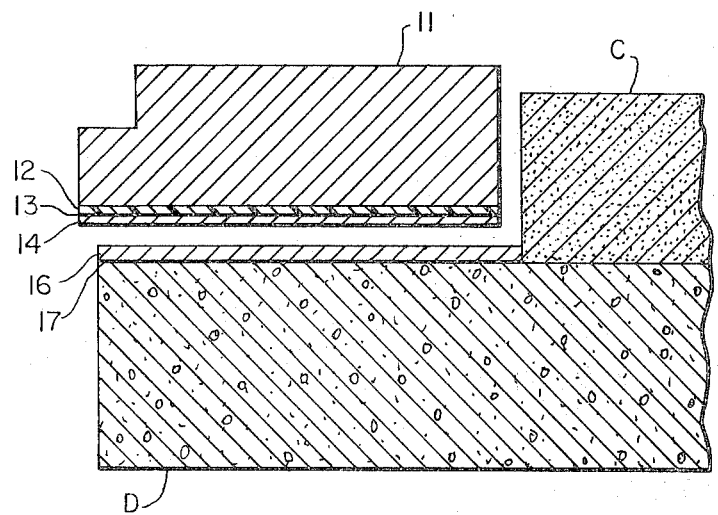
FIGS. 8 and 9 represent the crosssectional view, for the purpose of explanation, of the reinforcement and paving materials to the corner of the pavement expansion joint.
Figure 9:
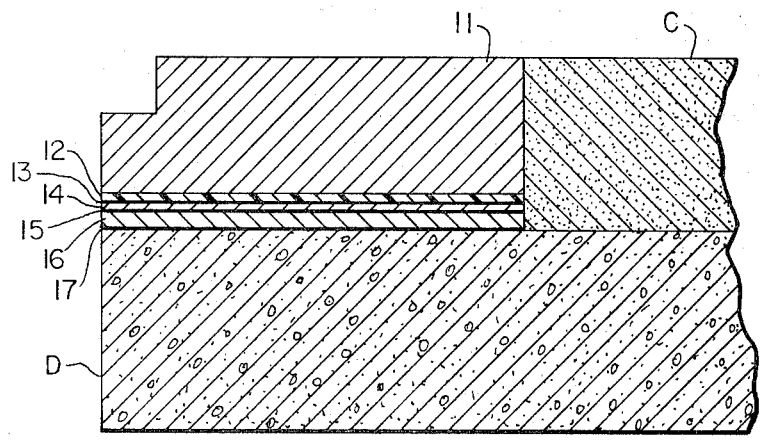
Figure 10:
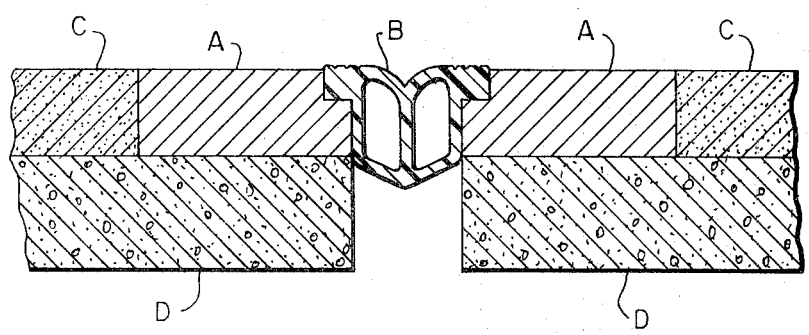
FIG. 10 gives a cross-section of the pavement expansion joint equipped with reinforcement and paving materials of the present invention.

Now to elaborate on the subject design, as may be observed from FIG. 6, the layer of mortar 11 and rubber pad 12, are incorporated into the steel sheet 14 by the adhesives layer 13. In FIG. 7 is shown another variation comprising steel sheet 16 which is bonded to steel sheet 14 through the intermediary of adhesives layer 15 which may be readily ripped off. The former is intended for repair work on the pavement expansion joint and the latter for new installations.

The reinforcement and paving materials C for new installation is, as are shown in FIGS. No. 9 and No. 10, bonded to the top of the slab D. Between the ends of slab C, joint seal rubber B is applied. To repair the joints the layer of adhesives 15 is stripped off from between steel sheets 14 and 16, and the materials intended for repair work are bonded to the top of steel sheet 16, which is held in place by an additional layer of adhesive 17.

The reinforcement and paving materials for the corner of the pavement expansion joint in the subject design, as are represented in FIGS. 6 and 7 are made with a 1-2 mm thick, sandblasted steel sheet 14 which is bonded to a 1-2 mm thick rubber pad 12 at the bottom of the frame which forms the corner edge of the expansion joint free from epoxy resins such as that of polyethylene base; or with a steel sheet 14 bonded to a 6-9 mm thick, sandblsted steel sheet 16, which is placed under rubber pad 12 and on top of which is poured epoxy mortar whose ingredients are epoxy resin monomer, glass fibre pieces and silica sand. This, still in a frame, is put in a furnace for epoxy mortar copolymerization.

This will then be taken out of the furnace when the copolymerization is complete, the frame is removed and the materials in the subject design are obtained, coming in the size of 5-10 cm in height, 10-20 cm in breadth and 100-200 cm in length.

The pavement expansion joint to which the reinforcement and the paving materials of the subject design are applied to the corner inevitably requires repair work during the course of a long use. On that occasion, a wedge is driven into the adhesives layer 15 which is sandwiched between steel sheet 14 and steel sheet 16 and then the adhesive layer is pulled off. The rubber pad 13 on steel sheet 14 causes steel sheet 14 to bend towards the rubber pad where the wedge was hammered in in a small scale, making it easier to rip off the adhesives layer. It requires far less force to drive in the wedge and strip off the adhesives layer than when the reinforcement and paving materials have no rubber pad incorporated therein. In addition, the rubber pad will work to protect the adhesives layer from impact of automobiles travelling on the pavement.

An alternate embodiment of the invention provides a combination of expansion joints and a joint seal of special shape having protuberances on the top surface of the seal used to as water-tight tops for expansion joints of highways and bridges for waterproofing.

With the development of paved roads, various inventions and designs were made about the shape of expansion joints. At the same time, the seals made of various materials like bitumen board, rubber board, sponge, hollow rubber, etc. were designed and used for expansion joints of paved roads.

However, development of highways and increased speed of automobiles made the noise emitted by cars passing these expansion joints larger and larger, and the people living near the expansion joints are being constantly tormented by this noise.

On the other hand, while cars are obligated to make the engine noise smaller with the use of a muffler, the noise emitted by cars passing the expansion joints is never regulated, nor has any device been designed to prevent its noise.

The special joint seal of elastic material for an expansion joint is designed to make the noise emitted last a very short time when the tire of a car and the joint seal touch and separate as little as possible without changing the original purpose of the joint seal.

When the noise emitted by touching of the tire and the road is compared among (a) smooth-surfaced paved road, (b) coarse-surfaced paved road. (c) unpaved flat road, and (d) paved road on a rainy day, (d) is the largest and (a) is the smallest at a speed of 40 km per hour. However, at a speed of 80 km per hour, (d) is the largest, followed by (a) and (b), with (c) being the smallest.

The reasons for these are that two flat surfaces which touch each other create a thin air when separated suddenly. On a rainy day, two surfaces are almost in close contact because of rain water. The noise emitted by a car passing over the conventional expansion joint is caused between the tire and the joint seal by a quick repetition of compression and thinning of the air plus friction when the elastic joint seal and the elastic tire touch each other rapidly and separate rapidly.

The situation at this time is that the elastic joint seal deforms and rises, being trod by the tire, rubbing the tire, and being pulled by the tire, and separates suddenly, thus emitting the noise. The elastic joint seal then returns to the original state. The noise is emitted also when the joint seal is deformed, pulled, and restored to the original state. These noises are relatively large and, if they are emitted constantly, give an unpleasant feeling to the people living in the noise.

The seal of this invention is specially designed as to the shape of the part of the joint seal which comes in contact with the tire so that the thinning of the air will not occur when the tire separates rapidly.

Figure 11:
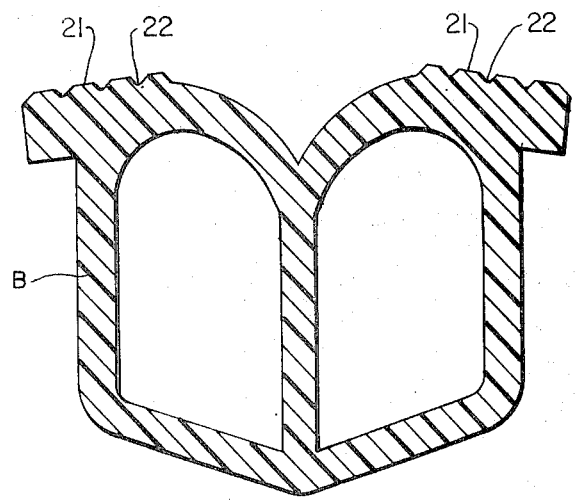
FIGS. 11–16 show the expansion joint seal used according to the present invention.
Figure 12:
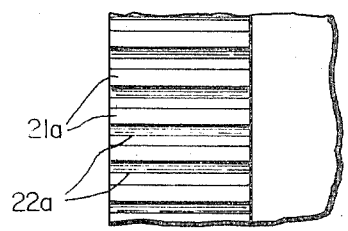
Figure 13:
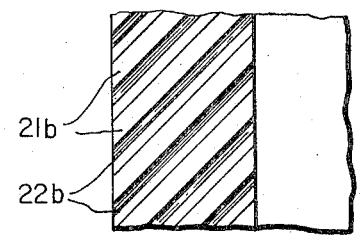
Figure 14:
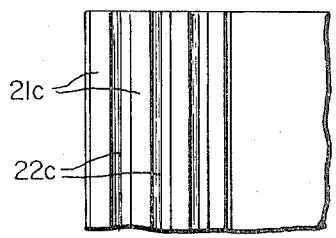
Figure 15:
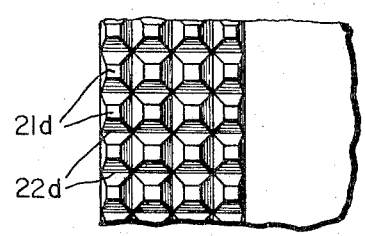

That is to say, the seal is made up of an elastic material as shown in FIG. 11; and as shown in FIG. 12-15. Fine protuberances are arranged vertical, parallel, or diagonal to the direction of the long side of the joint seal. FIG. 11 shows the expansion joint seal B with protuberance 21 and valley 22 on the top. FIG. 12 shows protuberance 21a and valley 22a are arranged perpendicular to the direction of the long side of the seal; FIG. 13 shows protuberance 21b and vally 22b are arranged on a diagonal; FIG. 14 shows protuberance 21c and valley 22c are arranged parallel; and FIG. 15 shows protuberance 21d and valley 22d of trapezoid shape. These protuberances may be arranged in any pattern provided that they are 3 – 5 mm high and 5 – 10 mm wide.

Figure 16:
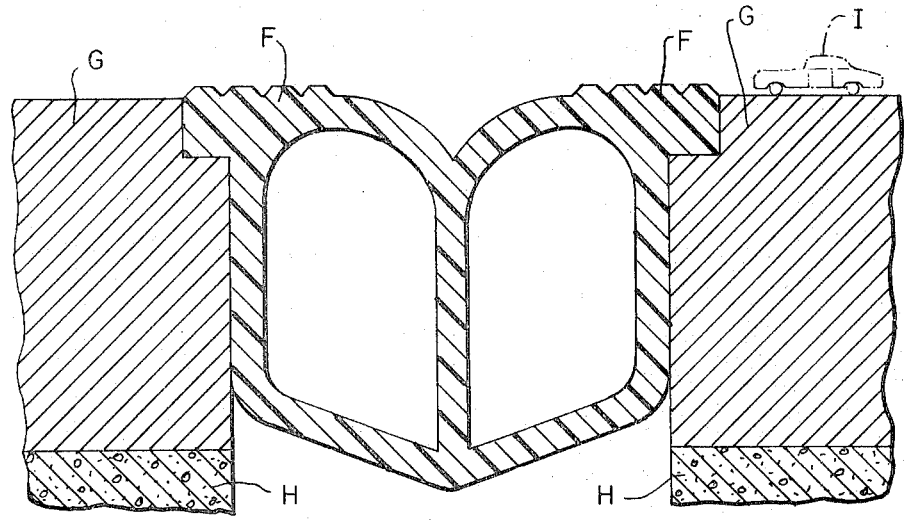

FIG. 16 shows a cross-sectional view of the actual use of the joint seal of the invention. The joint seal F of this invention is put at the pavement G of expansion joint and deforms in accordance with expansion and contraction of floor H and pavement. On this runs car I. The noise emitted by a car running on this joint seal is far smaller than the noise emitted when running a car over the conventional joint seal show in FIG. 5.

We claim:
1. A pavement expansion joint unit comprising:
    a. a first metal sheet secured to a pavement slab;
    b. a sheet means;
    c. an adhesive layer means substantially coextensive with and between said first metal sheet and said sheet means for adhesively attaching said first metal sheet to said sheet means, said adhesive layer means having a high tensile strength and being easily strippable so that said first metal sheet and said sheet means are readily separable; and
    d. a cured layer affixed to said sheet means said cured layer comprising a mixture of epoxy mortar, short glass fibers and silica sand.

2. The expansion joint of claim 1, wherein said sheet means comprises a metal sheet.

3. The expansion joint of claim 2, wherein said sheet means includes a rubber sheet.

4. A pavement expansion joint comprising:
    a. two adjacent expansion joint units each unit comprising
        a first metal sheet secured to a pavement slab;
        a sheet means;
        an adhesive layer means substantially coextensive with and between said first metal sheet and said sheet means for adhesively attaching said first metal sheet to said sheet means, said adhesive layer means having a high tensile strength and being easily strippable so that said first metal sheet and said sheet means are readily separable;

a cured layer affixed to said sheet means said cured layer comprising a mixture of epoxy mortar, short glass fibers and silica sand; and
    b. elastic joint seal means between said two adjacent expansion joint units said seal means having a plurality of spaced projections on the exposed surface thereof whereby the contact area of a tire and said seal means is reduced thereby reducing the noise as a tire passes over said seal means.

5. The pavement expansion joint of claim 4, wherein said projections are ridges running perpendicular to the length of said seal means.

6. The pavement expansion joint of claim 4, wherein said projections are ridges running parallel to the length of said seal means.

7. The pavement expansion joint of claim 4, wherein said projections are ridges running on a diagonal with respect to the length of said seal means.

8. The pavement expansion joint of claim 4, wherein said projections form trapazoids on the surface of said seal means.

* * * * *

UNITED STATES PATENT OFFICE
CERTIFICATE OF CORRECTION

Patent No. 3,829,228   Dated August 13, 1974

Inventor(s) MIYAZAKI ET AL.

It is certified that error appears in the above-identified patent and that said Letters Patent are hereby corrected as shown below:

In the listing of assignees:

Line 1 after "Nihon" add --Koken--

Signed and sealed this 31st day of December 1974.

(SEAL)
Attest:

McCOY M. GIBSON JR.
Attesting Officer

C. MARSHALL DANN
Commissioner of Patents